Dec. 22, 1931.  W. R. MILNER  1,837,666
ROADSTER TIRE CARRIER
Filed Dec. 23, 1927
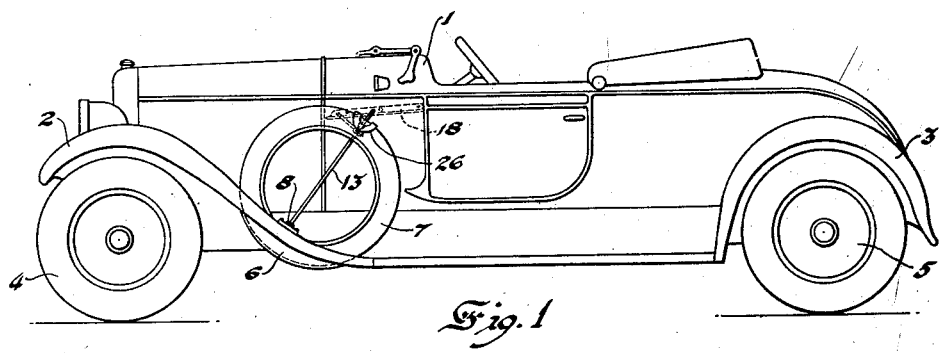
Fig. 1
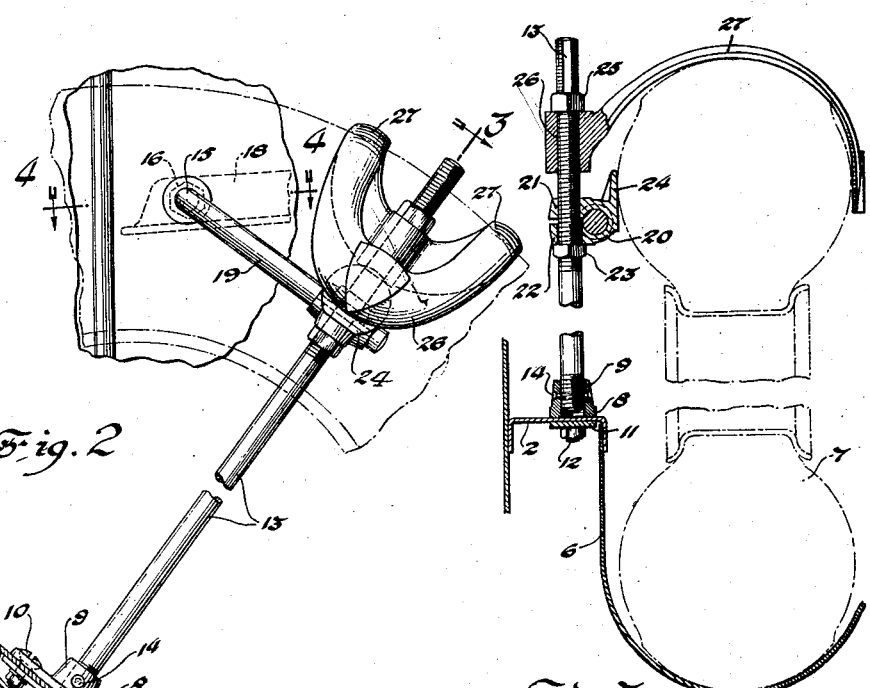
Fig. 2
Fig. 3
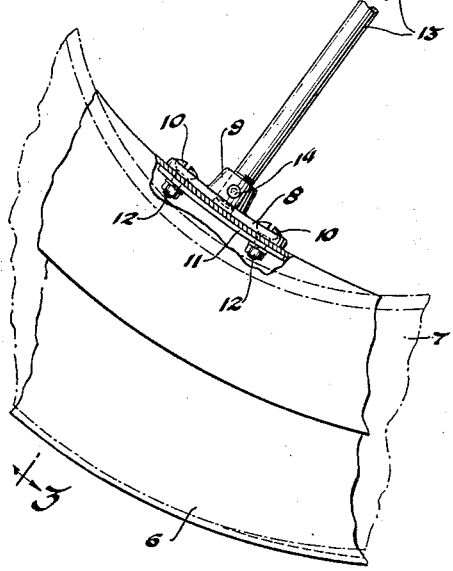
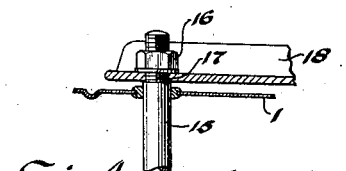
Fig. 4
Inventor
Wilfred R. Milner
By Blackmore, Spencer & Hulse
Attorneys Patented Dec. 22, 1931

1,837,666

UNITED STATES PATENT OFFICE

WILFRED R. MILNER, OF PONTIAC, MICHIGAN, ASSIGNOR TO GENERAL MOTORS CORPORATION, OF DETROIT, MICHIGAN, A CORPORATION OF DELAWARE

ROADSTER TIRE CARRIER

Application filed December 23, 1927. Serial No. 242,125.

This invention relates to motor vehicles and more particularly to a novel arrangement for carrying a spare tire on the vehicle.

In certain types of automobiles, especially those with sport bodies, spare or extra tires are preferably carried by the front fenders on either or both sides of the body and forward of the doors.

The object of the present invention is to provide a tire holding arrangement of the front fender type, which will comprise but a few parts so as to be simple in construction and economical to manufacture, and which will firmly secure the tire in place without causing chafing of the tire casing, and which furthermore, will be attractive in appearance and in harmony with the pleasing design of the bodies with which it is used.

A preferred embodiment of the invention is shown in the accompanying drawings, wherein Fig. 1 is a side view of a roadster illustrating the application of the invention thereto.

Fig. 2 is a fragmentary side elevation of the tire carrier forming the present subject matter;

Fig. 3 is a view taken on line 3—3 of Fig. 2, and

Fig. 4 is a detail sectional view taken on line 4—4 of Fig. 2.

Referring to the drawings the numeral 1 indicates an automobile body, having fenders or guards 2 and 3, stamped or pressed from sheet metal, over the front and rear wheels 4 and 5 respectively. The front fender 2 is provided with a concave depressed portion forming a pocket or well 6, for the reception of a spare tire 7. On the side of the pocket or well 6, closest to the body 1, a bracket 8, having an interior threaded boss 9, is secured to the fender 2, by bolts 10 extending through aligned openings in the bracket, fender and a reinforcement plate 11 on the underside of the fender, which bolts have nuts 12 screw-threaded thereon. The ends of the bolts are preferably peened over after the nuts 12 have been drawn up for the purpose of insuring a more secure fastening connection. Anchored to the fender by means of the bracket, is an upwardly extending rod 13, whose lower end has screw-threaded engagement within the boss 9 and is held against removal therefrom, by a transverse rivet pin 14 passing through the boss and rod. The upper end of the rod 13 is braced from the side of the body 1, by means of an L-shaped rod, one portion 15 of which projects laterally from the side of the body and is secured thereto by a nut 16, screw-threaded on the reduced end 17 of the rod, which extends through an opening in an angle iron 18 forming a part of the cowl construction. The other portion 19 of the L-shaped rod is conected with the rod 13, through the medium of a bracket 20, having an opening therethrough for the rod portion 19, that part of the bracket to one side of the opening being split to form a pair of apertured ears 21 and 22. The ear 21 is interiorly threaded for engagement with the screw threads on the upper end of the rod 13, while the interior of the ear 22 is smooth or devoid of threads. Screw-threaded on the rod 13, in engagement with the ear 22, is a nut 23, adjustable to draw the ears together so as to contract the opening and clamp the bracket about the brace rod portion 19. On the side of the bracket opposite the split end, there is provided a flat disc-like portion 24, forming an abutment surface for the side wall of the tire. Secured by an adjustable nut 25 on the rod 13, is an arcuate retainer member, comprising the head 26 and a pair of curved arms 27—27, passing around the tire tread and extending down along the side wall of the tire casing. Upon unthreading the nut 25, the retainer member may be removed from the upwardly extending rod 13, to permit insertion or removal of a tire in the well or pocket 6. When a tire is positioned in the well, the retainer member engages a peripheral portion of the tire substantially diametrically opposite to that within the well and by the adjustment of the nut 25 will cause the tire to be firmly held in place. If desired, suitable locking means may be employed for engagement with the end of the rod 13 to prevent unthreading of the nut and unauthorized removal of the tire.

I claim:

1. In a tire holder, a fender having a pocket for the reception of a tire, an upwardly extending rod at one side of the pocket, a bracket secured on the upper end of said rod having a flat abutment surface for the side wall of a tire, a laterally extending brace rod secured in said bracket to brace the upwardly extending rod, and a clamp member adjustably carried by said rod and movable relative to said fender pocket, and adapted to extend about the periphery of a tire and engage the side wall thereof, opposite to that engaged by said abutment surface of the bracket.

2. Means to hold a tire in a fender well including a supporting rod secured to the fender at one side of the well and extending upwardly and diametrically of a tire to be positioned in the well, a brace rod extending laterally from the vehicle body, fastening means adjustably connected with both rods to adjustably secure the brace rod to the upper portion of the supporting rod, an arcuate member removably carried on the upper end of the supporting rod and engageable with the thread of the tire diametrically opposite the portion of the tire in the well, and means to move the member downwardly on the rod to clamp the tire between the member and well and to fixedly hold the member in clamping position.

3. Means to hold a tire in a fender well at the side of an automobile body including a rod adapted to be secured to the fender at one side of the well and to extend upwardly therefrom substantially diametrically of the tire to be mounted in the well, a brace rod adapted to extend laterally from the automobile body, a bracket adjustably secured to both rods to adjustably secure the rods together adjacent the upper end of the first mentioned rod, and a tire engaging member slidable on the upper end of said first mentioned rod toward and from the well, to removably clamp a tire in the well.

4. Means to hold a tire in a fender well at the side of an automobile body, including an arcuate tire engaging and clamping member to engage and receive the peripheral tread portion of a tire substantially diametrically opposite a portion of the tire positioned in the well, a supporting rod connected at its lower end to the fender and having said tire engaging member slidable on its upper end to removably clamp a tire in the well, means engaging the rod and adapted to move the tire engaging member into clamping position, and a brace connecting the rod adjacent its upper end to the automobile body.

5. In a motor vehicle, the combination with a fender having a tire receiving well therein, of means to firmly clamp a tire in and against the wall of the well, including a supporting rod fixedly secured at its lower end to the fender at one side of the well and extending upwardly therefrom, a tire engaging member having an apertured head for sliding engagement on said rod toward and from the well and an arcuate portion to engage and receive the peripheral tread portion of the tire diametrically opposite that located in the well, and a nut threaded on the rod for engagement with said tire engaging member to move the tire engaging member into clamping position.

6. In a motor vehicle, the combination with a fender having a tire receiving well therein, of means to firmly clamp a tire in and against the wall of the well, including a supporting rod fixedly secured at its lower end to the fender at one side of the well and extending upwardly therefrom, a tire engaging member having an apertured head for sliding engagement on said rod toward and from the well and an arcuate portion to engage and receive the peripheral tread portion of the tire diametrically opposite that located in the well, a nut threaded on the rod for engagement with said tire engaging member to move the tire engaging member into clamping position, and means to rigidly brace the upper end of the rod.

7. In a motor vehicle, the combination with a fender having a tire receiving well therein, of means to firmly clamp a tire in the well, including a supporting rod fixedly secured at its lower end to the fender at one side of the well and extending upwardly therefrom, a tire engaging member having an apertured head for sliding engagement on said rod toward and from the well and a portion to engage the tread of the tire diametrically opposite that located in the well, whereby the tire may be firmly clamped between the fender well and said tire engaging member, a brace rod extending laterally from the vehicle body, and a bracket connecting the two rods adjacent the upper end of the rod and having an abutment portion for the side of the tire.

8. In a tire holder, a fender having a pocket for the reception of a tire, an upwardly extending rod fixedly secured to the fender at one side of the pocket, a removable tire engaging clamp member slidably carried by said rod for engagement with the tread of the tire substantially diametrically opposite that portion of the tire in the pocket, and pressure exerting means carried by the rod and adapted to engage the clamp member and to cause the same to move toward the pocket to prevent removal of the tire.

9. In a tire holder, a fender having a pocket for the reception of a tire, an upwardly extending rod at one side of the pocket, means to brace the upper end of said rod a removable clamp member slidable on the upper end of said rod beyond said brace means for engagement with the tread of the tire diametrically opposite that portion of the tire in the pocket to clamp the tire between the clamp member and the pocket, and a nut threadedly engaged on the free end of the rod to hold the clamp member in clamping position.

10. In a tire holder, a fender having a well for the reception of a tire, a rod secured to the fender adjacent said well and extending upwardly therefrom, a tire retaining member mounted on said rod, said tire retaining member being movable on said rod longitudinally thereof, and separate clamping means mounted on said rod, said clamping means being adapted to exert pressure on said tire retaining member toward said fender well.

11. In a tire holder, a fender having a well for the reception of a tire, a rod secured to said fender adjacent said well and extending upwardly therefrom, a tire engaging member adjacent the upper end of said rod, and separate screw clamping means mounted on said rod adjacent its upper end, said clamping means being adapted to exert pressure on said tire engaging member and move the same toward said fender well, whereby the tire may be clamped between said fender well and said tire engaging member.

In testimony whereof I affix my signature.

WILFRED R. MILNER.